No. 649,572. Patented May 15, 1900.
F. W. ERICKSON.
CONTROLLING AND DISTRIBUTING ELECTRIC ENERGY.
(Application filed Feb. 24, 1900.)
(No Model.) 2 Sheets—Sheet 1.
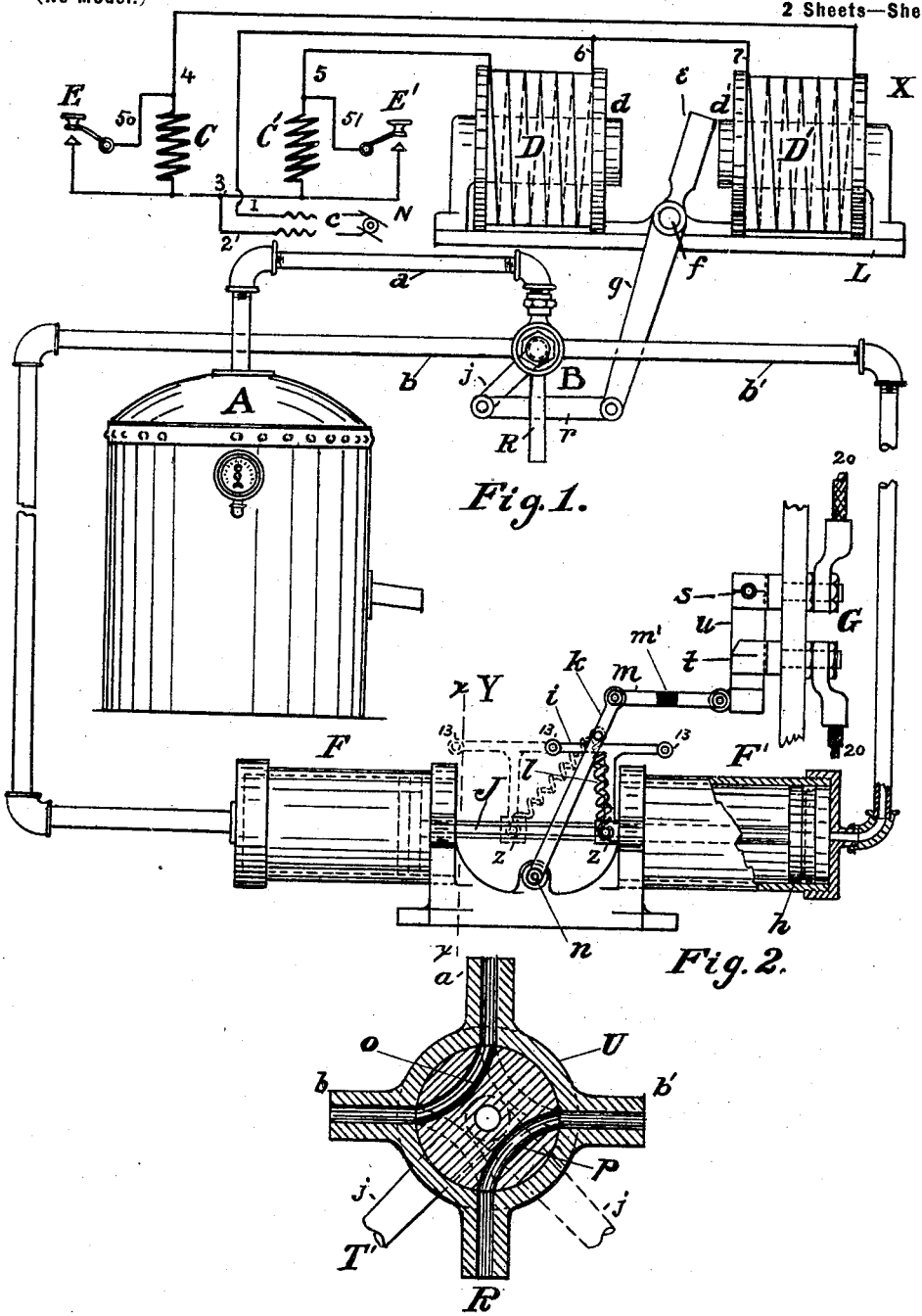

No. 649,572. Patented May 15, 1900.
F. W. ERICKSON.
CONTROLLING AND DISTRIBUTING ELECTRIC ENERGY.
(Application filed Feb. 24, 1900.)
(No Model.) 2 Sheets—Sheet 2.
Fig. 5.
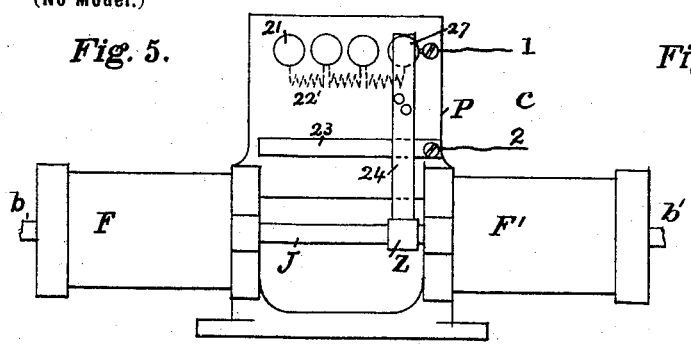
Fig. 6.
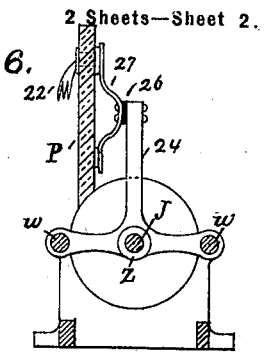
Fig. 4.
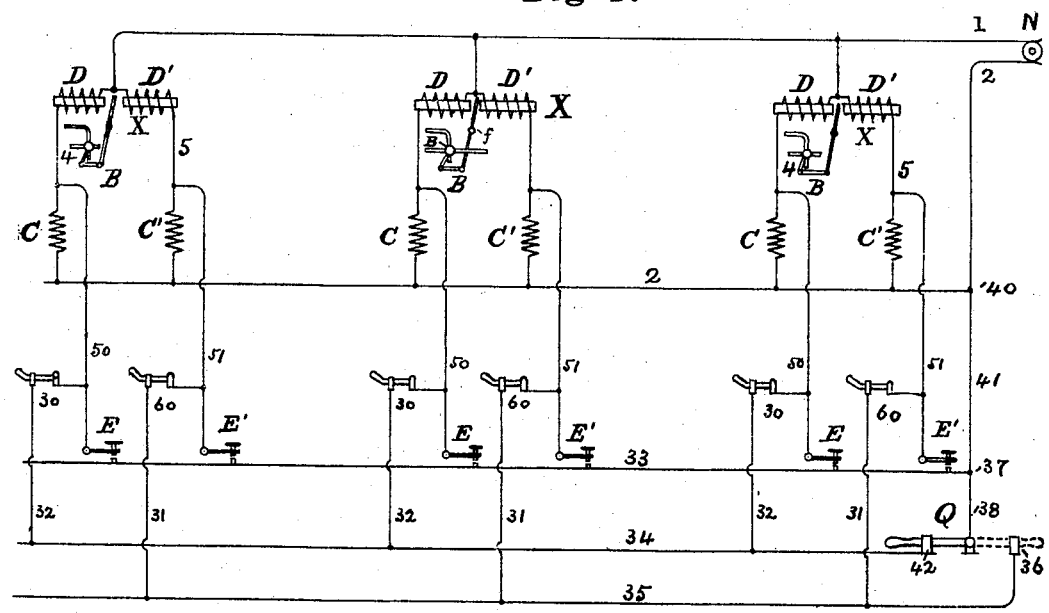
Fig. 4.ª
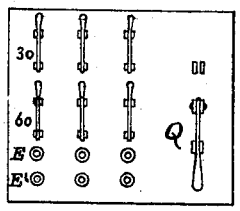
Fig. 3.
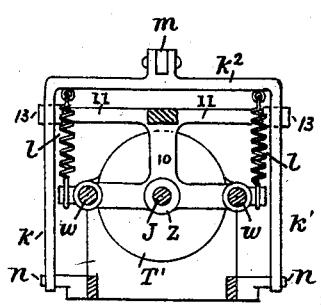
Fig. 3.ª
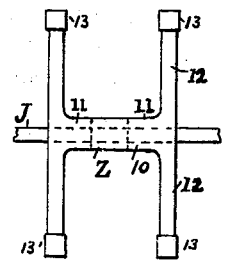
Attest,
V. M. Berthold
C. F. Aiken
Inventor,
Frederick William Erickson
by Geo Willis Pierce
attorney
THE NORRIS PETERS CO., PHOTO-LITHO., WASHINGTON, D. C.

UNITED STATES PATENT OFFICE.

FREDERICK WILLIAM ERICKSON, OF BOSTON, MASSACHUSETTS.

CONTROLLING AND DISTRIBUTING ELECTRIC ENERGY.

SPECIFICATION forming part of Letters Patent No. 649,572, dated May 15, 1900.

Application filed February 24, 1900. Serial No. 6,353. (No model.)

*To all whom it may concern:*

Be it known that I, FREDERICK WILLIAM ERICKSON, residing at Boston, in the county of Suffolk and State of Massachusetts, have invented certain Improvements in Controlling and Distributing Electric Energy, of which the following is a specification.

The present invention relates to a system for controlling the distribution of electric energy, such as the powerful electric currents employed for motors, electric lighting, and other translators.

The invention is designed to be used for regulating and controlling the powerful electric currents employed in small power-stations, theaters, and other places where such currents are manipulated by switches which are frequently operated. Such switches at the present time are directly and manually operated, and to produce the desired results, especially in theaters, where the current is employed to create spectacular lighting effects, which require frequent and quick changes, it becomes necessary to employ large and cumbersome devices which oftentimes require several men to operate them.

The purpose of the invention is to employ simple and quickly and easily operated individual manual electric devices to bring into action electromagnetic apparatus which is adapted to regulate and control a powerful and quick-acting force—such as air, steam, or other gas, or fluids, as water, in a compressed state—which shall through an appropriate motor and mechanical powers operate the switches or other apparatus employed to regulate, distribute, or modify the current in a working circuit.

The invention also consists in the combination of a plurality of such individual instrumentalities, whereby two or more such switches or other apparatuses may be operated simultaneously.

The invention consists, further, in various combinations and specific constructions, as I will now proceed to describe and claim.

In the drawings which illustrate the invention, Figure 1 is a diagrammatic representation of the invention adapted to open and close a switch. Fig. 2 is an enlarged cross-section of the pneumatic valve. Fig. 3 is a cross-section of the pneumatic motor on line $xx$ of Fig. 1. Fig. $3^a$ is a top view of the buffers and their frame. Fig. 4 is a diagram to illustrate the combination of a plurality of such units as is shown by Fig. 1. Fig. $4^a$ is an elevation of a back board or panel with switches; and Figs. 5 and 6 represent the application of the pneumatic apparatus to a theater-dimmer, in which a switch is adapted to admit more or less current to a working circuit.

Referring to Figs. 1, 2, and 3, X represents an electromagnetic device consisting of the electromagnets D D', secured to and insulated from a base-piece L, between which is the armature-lever $g$, pivoted at $f$ to the frame. The armature end $e$ is adapted to be attracted to the poles $d\,d'$ of the device alternately. $c$ is a circuit from a source of current N, its conductors 1 and 2 extending to the electromagnets, the conductor 1 connecting to one side of said electromagnets by the branches 6 and 7, while the conductor 2 is split at the point 3 into the branches 4 and 5, the former connecting to one side of the electromagnet D' and the latter to the electromagnet D, each branch including a resistance C.

E and E' are pressure-switches bridged around the respective resistances C and C'.

Y represents a motor adapted to be operated by compressed gas or fluid. For the purposes of this specification I represent the motor as actuated by compressed air confined in a proper receptacle A, from the top of which extends a supply-pipe $a$ to a valve B, which is adapted to switch the air into the pipes $b$ and $b'$, which connect with the respective cylinders F and F' of the motor.

R is an exhaust-pipe from the valve, which may extend to any suitable outlet.

$j$ is a lever connected to the rotating part U of the valve, at the lower end of which is pivoted the bar $r$, whose opposite end is pivoted to the lower end of the armature-lever $g$.

The cylinders F and F' are separated from each other by a suitable space, and their pistons $h$ are connected to each other by a rod J, to which is attached the slide $z$, whose arms are supported and adapted to slide back and forth upon the guide-rods $w\,w'$ in a manner well understood. The slide $z$ has an upright arm 10, from which extend arms 11 11 parallel with the piston-rod, from which arms project the side arms 12 12 12 12, bearing on their ends buffers 13, of rubber or some other suitable material.

$k\ k'$ are two levers pivoted at $n\ n$ to the sides of the motor-frame, which are united at their outer ends by the cross-bar $k^2$, provided with lugs and a bolt to receive and pivot the bar $m$, attached to the free end of the blade $u$ of the knife-switch G, which is pivoted at $s$, the said blade closing into the springs $t$ of the switch. The conductors 20 20 of the switch G are associated with any working circuit, which may contain any translating devices such as motors, lamps, &c.

The rotating member U of the valve B is provided with two passages or ways $o\ p$. The former is adapted to connect the pipe $a$ with the pipe $b$ or the pipe $b$ with the exhaust-pipe R, and the latter is adapted to connect the pipe $a$ with the pipe $b'$ or the pipe $b'$ with the exhaust R.

It will be seen that current from the source N circulates to some extent through the helices D and D'; but owing to the presence of the resistances C C' not enough passes therethrough to affect the said helices, and the circuit may be said to be normally open or balanced.

In the operation of the invention the switch G being closed to open the same the key E' is pressed to its anvil and current flows via conductor 2, through the bridge closed by the key, around the resistance C', conductor 5, helix D, and back by conductor 1, the electromagnet D is energized and the armature $e$ is attracted to its pole, thereby rotating on its pivot $f$ and pulling the valve-lever $j$ into the position shown in dotted lines in Fig. 2, so that the compressed air in the receptacle A flows from pipe $a$ by the passage $p$ of the valve B to the pipe $b'$ and to the cylinder F', causing the piston $h$ to move to the other end of the cylinder, and simultaneously therewith the piston in cylinder F moves to the opposite end of the said cylinder, and as the passage $o$ of the valve B now connects pipe $b$ with exhaust R the air which forced said piston over and which remains in the same now passes out the exhaust and escapes. The piston-rod J as it moves carries the slide $z$ and buffer-arms along with it and also the lower ends of two spiral springs $l$, which are attached to the same on either side and whose upper ends are connected to the cross-bar $k^2$ of the levers $k$, which levers are adapted to rotate between two buffers 13 and 13$^a$ on each side, respectively. When the piston-rod first moves, the levers $k$ are not affected; but as the lower ends of springs $l$ move away with the rod they stretch and exert more pull upon the said arms, and at a certain point in their movement (represented in dotted lines in Fig. 1) after the rear buffers 13$^a$ have reached the levers and moved them along then the springs exert a pull and bring the arms $k$ forcibly over, so that they strike against the end buffers 13, but as the rod continues to move the force of the blow is broken. When the arms are thus forcibly brought over by means of the mechanical connections shown, the blade $u$ of the switch G is suddenly pulled away from its springs $t$ and the circuit there is opened. I do not confine myself to the construction shown for suddenly operating the switch G, as I may use any other device in connection with the motor.

It will be readily seen that when the key E is closed the operation of the various parts is reversed and the switch G is then as suddenly closed. The presence of the resistances C assists in eliminating sparks when the keys E are opened, as will be readily understood.

Fig. 5 shows a modification in which the motor is adapted to operate a switching device to introduce more or less resistance 22 into the working circuit $c$. In this case an insulating-plate P is attached to the motor cylinders or frame in any suitable manner, secured to whose upper part are a series of metal disks 21, in line with each other, and are connected to each other and to the conductor 1 of the working circuit $c$ by the resistances 22. Secured to the slide $z$ is an upright arm having upon its inner side the spring-arm 27, insulated from the arm by the insulation 26. The upper end of the spring-arm is adapted to press upon the metal disks 22, and its lower end bears upon the metal bar 23, secured to the plate P, to which is connected the other conductor 2 of the circuit $c$. When the piston-rod is moved in either direction, the spring-arm traverses the disks 21 in series with one end and the bar 23 by the other end, and so switches in or out more or less resistances to reduce or augment the current in the circuit $c$ and so reduce that flowing in a lamp or a series of lamps associated with said circuit.

Fig. 4 illustrates a means whereby a plurality of electromagnetic devices, motors, and switches may be operated at once by the closing of a single key or switch, X X X representing three electromagnetic devices, Y Y Y representing three valves to operate the compressed air. The motors Y and the switches G are not shown in this diagram, but the operations will be fully understood by the following description.

N is the source of current, conveyed by the conductors 1 and 2 to the electromagnetic devices for the operation of the valves B, which convey the compressed air to the several motors, which open and close the switches G. In the diagram conductor 1 branches to one side of the helices D D' of each of the electromagnetic devices X, and from the conductor 2 the branches 4 and 5 extend to the opposite sides of said helices, including the resistances C and C', so that the electromagnetic devices are in parallel with the said conductors. Three additional conductors 33, 34, and 35 extend to the said electromagnetic devices; the former, 33, being connected at the point 40 on conductor 2 by wire 41. The second conductor is connected to a side spring of master-switch Q, whose blade is connected by wire 38 with point 37 of conductor 33, while the third conductor, 35, is connected to a second side spring of the switch Q. Bridge-wires 50 connect the wires 4 with keys E, whose anvils are connected with conductor 33, and bridge-wires 51 connect the wires 5 with keys E', whose anvils are also connected with conductor 33. There are auxiliary or permanent contact-switches 30, which are adapted to connect the conductor 34 with the wires 50 by the wires 32, and other auxiliary or permanent contact-switches 50, are adapted to connect the conductor 35 with the wires 51. The switches E and E', 30 and 60, and the switch Q are in practice arranged upon a panel, as shown, to be accessible to the operator, and if but one switch G is to be operated the corresponding switch E or E' is pressed and current flows precisely as described as of Fig. 1, and the switch G is opened or closed. But if two or more switches G are to be operated the auxiliary switches 30 and 60 of each unit are closed, as shown, and the switch Q closed to its side spring 42 or 36, depending whether the switches G are to be opened or closed. If they are closed and it is desired to open them, the blade of the switch Q is turned into the spring 42 and the current is then via conductors 2, 41, and 38, switch Q, spring 42, conductor 34, branches 32, switches 30, wires 50 and 4, and helices D to conductor 1, and all the armatures e are attracted to the electromagnets D, thus causing the valves B to rotate and switch the compressed air into the pipes b' and cause the switches G to be suddenly opened, as previously described.

By my invention it is possible for an operator to sit before a small panel and by means of the knife-switches 30 and 60 make all the various combinations that are required for any moment of a play at a theater and by means of the switch Q open and close or modify the current circulating in the working circuit c in the easiest and simplest manner, and if any one switch G is to be operated the keys or pressure-contacts E and E' can be operated although the switches 30 and 60 are closed, as will be readily seen. The panel can be in some place quite near the stage, and the electromagnetic devices X and the motors Y may be at a distance in a basement or other suitable place.

It will be understood that the source of current N may be common to all the units.

Having described the invention, I claim—

1. The combination in a system for controlling the distribution of electric energy, a source of current, an electromagnetic reversing device in a normally open or balanced circuit, plural means for manually switching the source of current to the opposite poles of the said reversing device alternately, a source of gas or fluid under pressure, a regulating-valve therefor operated by the said reversing device, a motor-reversing device operated by said gas or fluid, consisting of two separated tandem cylinders having a common piston-rod, connected midway of the same, to a pivoted lever whose upper end is pivotally attached to the handle of a switch which is adapted to control the current in an electric circuit.

2. The combination in a system for controlling the distribution of electric energy, a source of current, an electromagnetic reversing device in a normally-balanced circuit, plural means for switching the source of current to the opposite poles of said reversing device alternately, a switch adapted to regulate the current in a working circuit, a source of compressed gas, a regulating-valve therefor operated by the said reversing-switch, a reciprocating reversing-motor, a lever attached to the motor-frame and to the said switch, and means operated by the piston-rod of the motor to suddenly open the said switch.

3. The combination in a system for controlling the distribution of electric energy, of an electromagnetic reversing device consisting of two independent helices, a pivoted armature-lever between their poles, an electric circuit one terminal of which is connected to a terminal end of both helices in multiple, while the second electrode is split and each branch is connected to the opposite terminal end of one of the helices and includes a resistance, with a circuit-closer bridged about each resistance, a reciprocating reversing-motor operated by compressed gas or fluid, a regulating-valve for said gas or fluid connected with said pivoted armature-lever, adapted to admit the gas or fluid to the ends of said motor alternately, and a switch adapted to regulate or modify the current in a working circuit.

4. The combination in a system for controlling the distribution of electric energy, a source of current, an electromagnetic reversing device in a normally-balanced circuit, plural means for switching the source of current to the opposite poles of said reversing device alternately, a switch adapted to regulate the current in a working circuit, a source of compressed gas, a regulating-valve therefor operated by the said reversing-switch, a reciprocating reversing-motor whose piston-rod is externally supported by a slide in guides, a lever connected to the motor-frame and to the said switch a spring connecting the lever to the said slide, whereby when the piston-rod is moved the lower end of the spring is carried away from the lever and the lever suddenly brought over.

5. The combination in a system for controlling the distribution of electric energy, a source of current, an electromagnetic reversing device in a normally-balanced circuit, plural means for switching the source of current to the opposite poles of said reversing device alternately, a switch adapted to regulate the current in a working circuit, a source of compressed gas, a regulating-valve therefor operated by the said reversing-switch, a reciprocating reversing-motor having two tandem cylinders, a piston in each cylinder connected by a rod, supported between the cylinders of a slide in guides, a lever attached to the motor-frame and to the said switch, and means operated by the piston-rod of the motor to suddenly open the said switch.

6. The combination in a system for controlling the distribution of electric energy, of a plurality of units each of which is adapted to regulate and modify the current in a separate working circuit, each unit consisting of a source of current, an electromagnetic reversing device in a normally open or balanced circuit consisting of two independent helices, plural pressure-switches for switching the source of current to the opposite poles of the reversing device alternately, a source of gas or fluid under pressure, a regulating-valve therefor operated by the said reversing device, a motor-reversing device operated by said gas or fluid connected to a switch which is adapted to control the current in a working circuit; with means for switching the said sources of current to the opposite poles of all the reversing devices simultaneously and alternately.

7. The combination in a system for controlling the distribution of electric energy, of a plurality of units each of which is adapted to regulate and modify the current in a separate working circuit, each unit consisting of a source of current, an electromagnetic reversing device in a normally open or balanced circuit consisting of two independent helices, plural pressure-switches for switching the source of current to the opposite poles of the reversing device alternately, a source of gas or fluid under pressure, a regulating-valve therefor operated by the said reversing device, a motor-reversing device operated by the said gas or fluid connected to a switch which is adapted to control the current in a working circuit; with means for switching the said sources of current simultaneously to the said reversing devices to alternately open and close or modify the current in each of said working circuits.

8. The combination in a system for controlling the distribution of electric energy, of a plurality of units each of which is adapted to regulate and modify the current in a separate working circuit, each unit consisting of a source of current, an electromagnetic reversing device in a normally open or balanced circuit consisting of two independent helices, plural pressure-switches for switching the source of current to the opposite poles of the reversing device alternately, a source of gas or fluid under pressure, a regulating-valve therefor operated by the said reversing device, a motor-reversing device operated by said gas or fluid connected to a switch which is adapted to control the current in a working circuit; with means for switching the said sources of current simultaneously to the said devices to alternately open and close or modify the current in each of said working circuits, consisting of two permanent contact-switches for each unit, each of which is adapted to close two members of a circuit to include one of said independent helices, with a master-switch adapted to complete the said circuit.

9. The combination in a system for controlling the distribution of electric energy, of a plurality of units each of which is adapted to regulate and modify the current in a separate working circuit, each unit consisting of a source of current, an electromagnetic reversing device in a normally open or balanced circuit consisting of two independent helices, plural pressure-switches for switching the source of current to the opposite poles of the reversing device alternately, a source of gas or fluid under pressure, a regulating-valve therefor operated by the said reversing device, a motor-reversing device operated by said gas or fluid connected to a switch which is adapted to control the current in a working circuit; with means for switching the said sources of current simultaneously to the said devices to alternately open and close or modify the current in each of said working circuits, consisting of two permanent contact-switches for each unit, each of which is adapted to close two members of a circuit to include one of said independent helices, with a master-switch adapted to complete the said circuit, the said pressure-switches, pneumatic contact-switches and master-switch, secured to a panel or back board, as set forth.

In testimony whereof I have signed my name to this specification, in the presence of two subscribing witnesses, this 20th day of February, 1900.

FREDERICK WILLIAM ERICKSON.

Witnesses:
 GEO. WILLIS PIERCE,
 V. M. BERTHOLD.